US006832906B2

(12) United States Patent
Hamann

(10) Patent No.: US 6,832,906 B2
(45) Date of Patent: Dec. 21, 2004

(54) APPARATUS FOR GENERATING SURFACE PRESSURE IN AN INJECTION MOLDING MACHINE

(75) Inventor: Jens Hamann, Furth (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/848,685

(22) Filed: May 3, 2001

(65) Prior Publication Data

US 2002/0086087 A1 Jul. 4, 2002

(30) Foreign Application Priority Data

Sep. 25, 2000 (DE) ........................................ 100 47 363

(51) Int. Cl.[7] ................................................ B29C 45/64

(52) U.S. Cl. ....................... 425/170; 425/190; 425/193; 425/451.9; 425/595

(58) Field of Search ................................ 425/589, 595, 425/450.1, 451.9, 190, 193, 170

(56) References Cited

U.S. PATENT DOCUMENTS 5,269,998 A * 12/1993 Takagi et al. ............... 425/589

5,470,592 A * 11/1995 Steger ........................ 425/595

FOREIGN PATENT DOCUMENTS

| | | | |
|---|---|---|---|
| DE | 4336572 | | 12/1994 |
| DE | 19510488 | | 3/1996 |
| DE | 19531131 | | 2/1997 |
| DE | 19716071 | | 11/1997 |
| DE | 19903516 | | 8/2000 |
| JP | 5-293861 | | 11/1993 |
| JP | 6-122136 | | 5/1994 |
| JP | 10-12649 | * | 1/1998 |

* cited by examiner

*Primary Examiner*—James P. Mackey
(74) *Attorney, Agent, or Firm*—Baker Botts L.L.P.

(57) ABSTRACT

Apparatus for generating surface pressure in for example an injection molding machine wherein the machine has a stationary carrier platen, a clamping platen and a closing platen that can be moved electromechanically, and wherein the material to be molded is disposed between the closing and carrier platen. The compressive force of the closing platen is actuated by piezoelectric actuators.

22 Claims, 1 Drawing Sheet

AP
H1
SP
TP
P1
FH1
FH2
P7
H2

APPARATUS FOR GENERATING SURFACE PRESSURE IN AN INJECTION MOLDING MACHINE

BACKGROUND OF THE INVENTION

The present invention relates to an apparatus for generating surface pressure, in particular in an injection molding machine, having a stationary carrier platen and a clamping platen which can be moved in relation to said carrier platen and locked in a working position and which, on its side facing the carrier platen, has a closing platen that can be moved electromechanically. The material to be pressed or tools to be clamped are disposed between said closure platen and the carrier platen.

Generating a surface pressure as described above is generally known from the reference DE 43 36 572 C1. As disclosed in this reference, the clamping platen and closing platen of an injection molding machine are moved relatively quickly by a first moving mechanism, and then the clamping platen is locked in the working position. The injection molding operation is started and, in order to cushion the forces originating from the plastics flow front, the closing platen is moved out by an alternating magnetic field being applied to a positively magnetostrictive material.

However, an electromechanical movement acting on this principle has the disadvantage that relatively high current intensities are needed. In addition, a permanent current has to be maintained, even in the stationary state.

It is an object of the invention to construct an apparatus for generating surface pressure of the type mentioned above in such a way that a rapid and powerful electromechanical movement is achieved in the technically simplest possible way.

SUMMARY OF THE INVENTION

According to the present invention, the above-stated object is achieved by the compressive force of the closing platen, with the action of moving the closing platen at the working point being implemented by piezoelectric actuators. While these components have been used for a long time for various tasks in engineering, neither have been proposed nor used for moving closing platens in apparatus for generating surface pressure.

One embodiment of the invention is characterized by the fact that the piezoelectric actuators are distributed, preferably in matrix fashion, over the area between clamping platen and closing platen. This results in an arrangement of the actuators which can be implemented simply in technically comprehensible terms. However, it is also possible for the piezoelectric actuators to be distributed over the area between clamping platen and closing platen in accordance with the desired force distribution i.e., hardware implementation of the force distribution. The manner in which such an arrangement is to be made can be determined analytically or by means of trials. A second possibility, corresponding with a force distribution, consists in actuating the piezoelectric actuators differently i.e., software implementation of the force distribution.

In the event that the behavior of the material to be pressed or the tools to be clamped exhibits a dynamic behavior, the piezoelectric actuators can be triggered dynamically, to match said behavior, such that the responsive behavior can be configured so as not to damage the machine.

For the case in which relatively long distances have to be bridged with the aid of the piezoelectric actuators, it proves to be advantageous if the closing platen can also be locked in at least one intermediate position which makes up a piezoelectric stroke and from which the clamping platen can subsequently be guided, the latter then being locked and the closing platen being moved out by a further piezoelectric stroke.

The piezoelectric actuators can be produced with any desired geometry in accordance with production possibilities, and can therefore be matched relatively easily to all machine requirements. A cube-like geometry is preferred.

Additional piezoelectric sensors may be provided between closing platen clamping platen, so that pressure measurements can be performed completely independently of the piezoelectric actuators. However, it is also possible that, during operation, a subset of the piezoelectric actuators can be used as piezoelectric sensors and, likewise, it is also possible that, during operation, piezoelectric actuators can be used briefly as piezoelectric sensors. The foregoing alternatives have the advantage that double use of the piezoelectric actuators is made, with the latter being used as piezoelectric sensors.

DRAWINGS

An exemplary embodiment of the invention is illustrated in the drawings and is explained in more detail below. In the drawing.

DETAILED DESCRIPTION OF THE INVENTION

Figure 1:
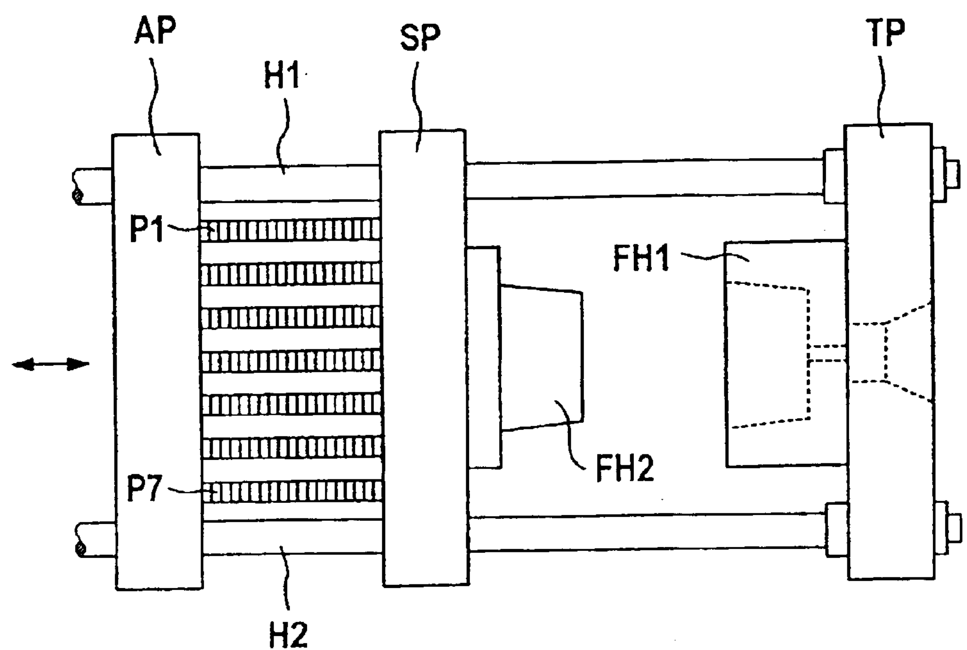
FIG. 1 shows elements of a plastic injection molding machine.

In FIG. 1, the components of a plastic injection molding machine which are essential to the present invention are shown. The machine is shown in the extended state, in which two half molds FH1 and FH2 are spaced apart from each other, so that a finished molding (not shown for reasons of clarity) can be removed from the machine. The half mold FH1, has an internal contour which is indicated by a dashed line and which is fixed to a stationary carrier platen TP. From the latter, spars extend from each corner, of which only the spars H1 and H2 can be seen in the illustration. On these spars, for example the spars H1 and H2, a clamping platen AP can be moved bidirectionally and relatively quickly by a drive, which is not shown for reasons of clarity. This movement is indicated by a double arrow. A closing platen SP is also arranged, together with the clamping platen AP, in a sliding manner on the spars, for example the spars H1 and H2. Piezoelectric actuators are disposed between the clamping platen AP and the closing platen SP, of which only the piezoelectric actuators P1 to P7 can be seen in the illustration according to FIG. 1. In order to protect the piezoelectric actuators against inadmissible tensile stresses, they are mounted between the closing platen SP and the clamping platen AP so as to be prestressed mechanically.

When a workpiece is to be created, the clamping platen AP and closing platen SP are moved in such a way that the half molds FH1 and FH2 butt against each other. The clamping platen AP is then locked in its position in a force-fitting and/or form-fitting manner with respect to the spars, for example the spars H1 and H2, by aids which are likewise not illustrated for reasons of clarity, and the thermoplastic material can be injected into the space between the half molds FH1 and FH2. However, in order to compensate for mechanical deformations in the overall system, the flow pressure of the injected material must be opposed by the half mold FH2 with a deflection defined by the mechanics of the machine, which is carried out with the aid of the piezoelectric actuators, which are actuated electrically for this purpose. This activation can in this case be carried out simultaneously for all the actuators or else by means of an adapted, chronologically staggered reaction of the piezoelectric actuators in accordance with the propagation properties of the plastic between the half molds FH1 and FH2.

Figure 2:
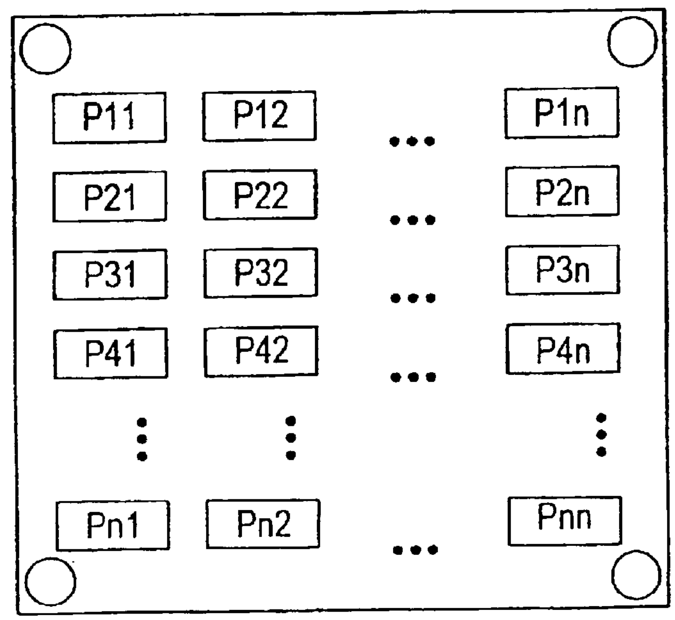
FIG. 2 shows an arrangement of piezoelectric actuators.

The fact that the piezoelectric actuators are distributed over the area of the closing platen SP can be taken from the illustration of FIG. 2, which shows that, in addition to one row of piezoelectric actuators, still further rows of piezoelectric actuators can be provided. The number and the geometry of the piezoelectric actuators depends on the required closing force and the expansion of the apparatus for generating surface pressure which have to be compensated for. The strictly matrix-like arrangement, preferably shown here, however can certainly be varied in accordance with the machine requirements, and can be selected as desired. To this end, the mechanical behavior of the system has to be determined for the tools and machines used.

In the present invention a determination of the mechanical relationships can be carried out, during operation, by a subset of the piezoelectric actuators while used as piezoelectric sensors. These actuators do not then have a control voltage applied to them which triggers a piezoelectric stroke. Instead, the generator behavior of the actuators is used, specifically that under the influence of a force, a voltage can be tapped-off across the actuators. In principle, it is also possible for some or all the actuators to be used briefly as sensors. In this case, it will be necessary, of course, to take into consideration the tolerable movements of the available masses. As an alternative, or as an addition, however, it would certainly be possible for further piezoceramics, used only as sensors, to be disposed between the piezoelectric actuators and, on account of their smaller dimensions, still find space therefor.

In the case in which the distances which can be triggered by the piezoelectric actuators are too small for the machine behavior, the closing platen SP can be fixed in a force-fitting and/or form-fitting manner, just like the clamping platen AP, by means of a mechanism, likewise not shown for reasons of clarity. Initially, the closure platen SP will not be locked and, starting from a locked clamping platen AP, a piezoelectric stroke will be carried out. The closing platen SP will then be locked and then the unlocked clamping platen AP will subsequently be guided and locked, and then the closure platen SP will be released and a further piezoelectric stroke brought about.

Apparatus for generating surface pressure are understood to mean not only injection molding machines but, for example, also other pressing and compressing machines in production engineering.

What is claimed is:

1. A pressure-generating apparatus comprising a stationary carrier plate, and a clamping plate traveling in relation thereto and capable of being fixed in working position, said clamping plate comprising on its side opposite towards the carrier plate an electromechanically disengageable closure plate, wherein material to be pressed or tools to be clamped are arranged between the closure plate and the carrier plate, further wherein a plurality of piezoelectric actuators are arranged between the closure plate and the clamping plate, and the closure plate is capable of being fixed in at least one piezo displacement intermediate position from which intermediate position the clamping plate can be guided and subsequently fixed with the closure plate being disengaged by an additional piezo displacement.

2. The apparatus according to claim 1 wherein the piezoelectric actuators are in a random distribution pattern on the surface between the clamping plate and the closure plate.

3. The apparatus according to claim 1 wherein the piezoelectric actuators are present on the surface between the clamping plate and the closure plate as a function of a distribution of force over the surface between the clamping plate and the closure plate.

4. The apparatus according to claim 1, wherein the piezoelectric actuators are of a type capable of being differentially triggered according to a desired distribution of force over the surface between the clamping plate and the closure plate.

5. The apparatus according to claim 1, wherein the piezoelectric actuators are of a type capable of being triggered dynamically so as to match a dynamic behavior of the material to be pressed and/or the tools to be clamped.

6. The apparatus according to claim 1, wherein the piezoelectric actuators are in a geometric pattern which corresponds to machine requirements.

7. The apparatus according to claim 1, wherein a subset of piezoelectric actuators are dual use means capable of piezoelectric actuation and piezoelectric sensoring.

8. The apparatus according to claim 7, wherein all piezoelectric actuators are dual use means capable of piezoelectric actuation and piezoelectric sensoring.

9. The apparatus according to claim 1 for use in an injection molding machine.

10. The apparatus according to claim 2, wherein the piezoelectric actuators are distributed in a matrix.

11. The apparatus according to claim 6, wherein the piezoelectric actuators are in the shape of a rectangle.

12. A pressure-generating apparatus comprising:

a stationary carrier plate, a clamping plate which can be moved in relation to the carrier plate and is capable of being fixed in working position, a closure plate which can be moved in relation to the clamping plate and is capable of being fixed in working position, the closure plate being arranged between the carrier plate and the clamping plate, a plurality of piezoelectric actuators arranged between the closure plate and the clamping plate for electromechanically moving the closure plate, wherein material to be pressed or tools to be clamped are arranged between the closure plate and the carrier plate.

13. The apparatus according to claim 12, wherein the piezoelectric actuators are in a random distribution pattern on the surface between the clamping plate and the closure plate.

14. The apparatus according to claim 12 wherein the piezoelectric actuators are present on the surface between the clamping plate and the closure plate as a function of a distribution of force over the surface between the clamping plate and the closure plate.

15. The apparatus according to claim 12, wherein the piezoelectric actuators are of a type capable of being differentially triggered according to a desired distribution of force over the surface between the clamping plate and the closure plate.

16. The apparatus according to claim 12, wherein the piezoelectric actuators are of a type capable of being triggered dynamically so as to match a dynamic behavior of the material to be pressed and/or the tools to be clamped.

17. The apparatus according to claim 12, wherein the piezoelectric actuators are in a geometric pattern which corresponds to machine requirements.

18. The apparatus according to claim 12, wherein a subset of piezoelectric actuators are dual use means capable of piezoelectric actuation and piezoelectric sensoring.

19. The apparatus according to claim 18, wherein all piezoelectric actuators are dual use means capable of piezoelectric actuation and piezoelectric sensoring.

20. The apparatus according to claim 12 for use in an injection molding machine.

21. The apparatus according to claim 13, wherein the piezoelectric actuators are distributed in a matrix.

22. The apparatus according to claim 17, wherein the piezoelectric actuators are in the shape of a rectangle.

* * * * *